United States Patent Office 3,520,625
Patented July 14, 1970

3,520,625
PHOTOELECTRIC MICROSCOPE
Claude Gillieron, Lausanne, Robert Viret, Geneva, and Alain Stahl, Carouge, Geneva, Switzerland, assignors to Societe Genevaise d'Instruments de Physique, Geneva, Switzerland, a corporation of Switzerland
Filed June 9, 1967, Ser. No. 645,006
Claims priority, application Switzerland, Oct. 18, 1966, 15,139/66
Int. Cl. G01n *21/60;* G01b *9/04*
U.S. Cl. 356—211                                15 Claims

ABSTRACT OF THE DISCLOSURE

The invention relates to photoelectric microscopes having a periodically vibrating member around a centered position driven in its oscillation by means of an actuating device. The invention provides for an automatic control of said oscillating movement and correction of any amplitude or symmetry error of the same. This is achieved by a central drive feed by the electrical output of a detecting device of the oscillating condition of said vibrating element and delivering both amplitude and symmetry error signals acting on said actuating device to correct any amplitude respectively symmetry errors of the said oscillating condition of the vibrating element.

---

The precision of the existing photoelectric microscopes comprising an oscillating member, under the form of an obturator or of a deflector for example, depends largely on the regularity of the oscillating amplitude of this vibrating member and of the symmetry of this oscillation with respect to a reference axis.

Up to now the manufacturers of such photoelectric microscopes have tried to reduce the amplitude errors and the symmetry errors of the oscillation of the oscillating member by improving the design of this oscillating member and of its driving device. These constructive features do not permit however suppressing the amplitude and symmetry errors of the oscillation of the oscillating member to a sufficient extent for the production of very high precision photoelectric microscopes.

The present invention has for its object a photoelectric microscope comprising among other things a vibrating member driven in a periodic oscillation around a centered reference position by means of an actuating device, which tends to remedy foregoing drawbacks by the fact that it comprises a regulating device for the actuating device of the vibrating member comprising a detecting device furnishing an electrical signal depending on the actual oscillating conditions of the vibrating member as well as a control device, fed by this electrical signal and delivering on the one hand a first error signal relating to the amplitude of the oscillation of the vibrating member and on the other hand a second error signal relating to the symmetry of the oscillation of this vibrating member with respect to the said reference position and by the fact that these two error signals alter the working conditions of the actuating device of the vibrating member so as to correct any amplitude and symmetry error of the oscillation of the vibrating member with respect to its normal oscillating condition.

The attached drawing shows schematically and by way of example two embodiments of the photoelectric microscope according to the invention.

The photoelectric microscope shown comprises as do the existing photoelectric microscopes and optical sighting device, an oscillating deflector which oscillates the optical axis of this sighting device periodically on either side from a centered position as well as a photoelectric cell receiving the light reflected through the surface of a precision ruler and feeding an electronic measuring device.

The optical sighting device comprises among other things a light source 1, lenses 2, a mask 3 presenting a narrow slot 4, a separator 5 constituted by a semi-transparent mirror as well as an objective 6 disposed in front of the ruler 7 which is sighted. The reflected rays, separated from the incident rays by means of the semi-transparent mirror 5 are directed onto a photoelectric cell 8 which feeds the electronic measuring device which is not shown.

The deflector 9 is constituted by a parallel faced glass driven through an actuating device 10 in a periodical oscillation around a centered angular position.

Photoelectric microscopes of this type are well known and described for example in the British Pat. No. 686,-274 or in the U.S. Pat. No. 3,042,804.

The present invention has for its object a regulating device of the amplitude as well as of the symmetry, with respect to the centered position, of the oscillation of the deflector so as to increase the precision of the photoelectric microscope.

The regulating device comprises a detection device A and a control device B.

Figure 1:
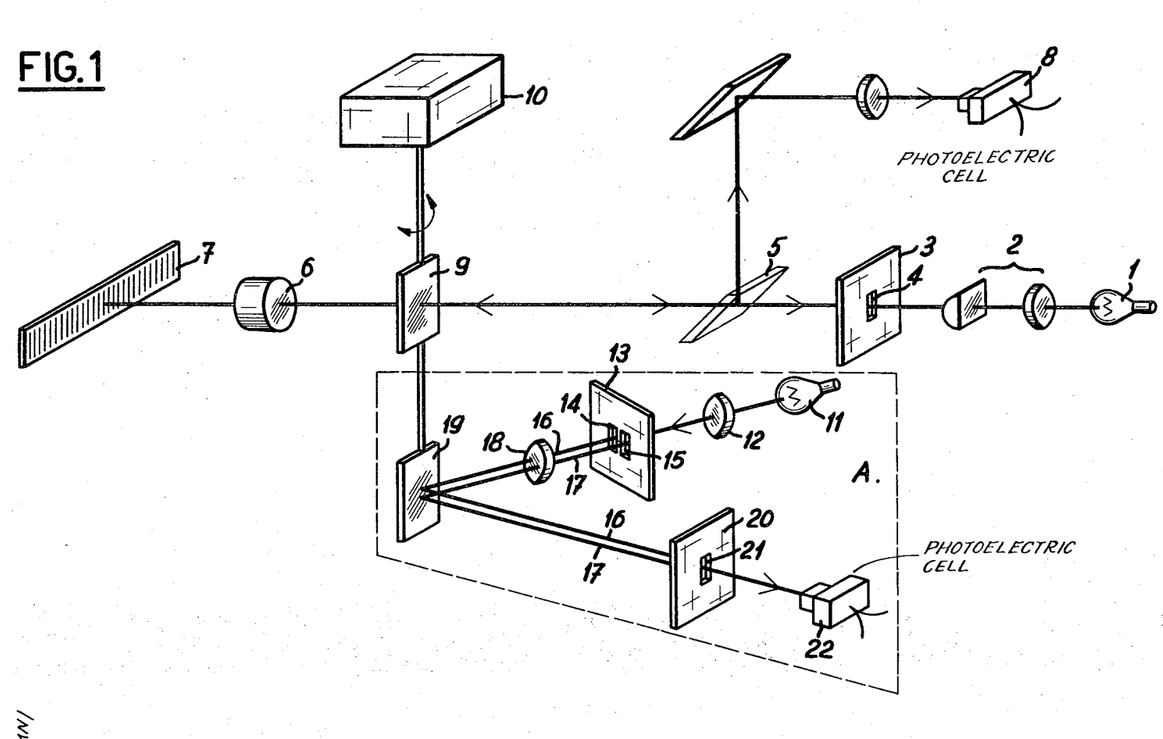
FIG. 1 is a diagram in perspective of a first embodiment of the photoelectric microscope.

The first embodiment shown in FIG. 1 comprises an optical detection device A comprising a light source 11, a condenser 12 forming a pencil of parallel rays impinging on a mask 13 which presents two slots 14, 15. The pencils of rays 16, 17 are concentrated through a lens 18 and reflected by means of a mirror 19, fast with the deflector 9 and making thus a periodical oscillation which is rigorously identical to that of the deflector, reflecting these pencils of rays 16, 17 on a mask 20 presenting only one slot 21. A photoelectric cell 22 is placed behind this slot 21 and receives the pencils of rays 16, 17 when they pass through the slot 21.

The detecting device is adjusted in such a way that when the oscillatory movement of the deflector is normal that is to say that it makes an angular reciprocal movement symmetrical with respect to the centered reference position with a determined amplitude X, the photoelectric cell 22 emits four electrical pulses for each cycle of the deflector, that is of the mirror 19, which follow themselves at perfectly constant and equal time intervals. One can show that it is necessary therefore that the geometrical distance betwen the pencils of rays 16 and 17 be equal to $\sqrt{2}/2$ multiplied by the amplitude X of the oscillation of the deflector. Further the mask 20 has to be placed in such a way that the slot 21 be located exactly in the middle between the pencils of rays 16, 17 when the deflector, and thus the mirror 19, is in its centered reference position. It is to be noted that this adjustment may be effected once for all time in the workshop and that it can be very precise.

Figure 3:
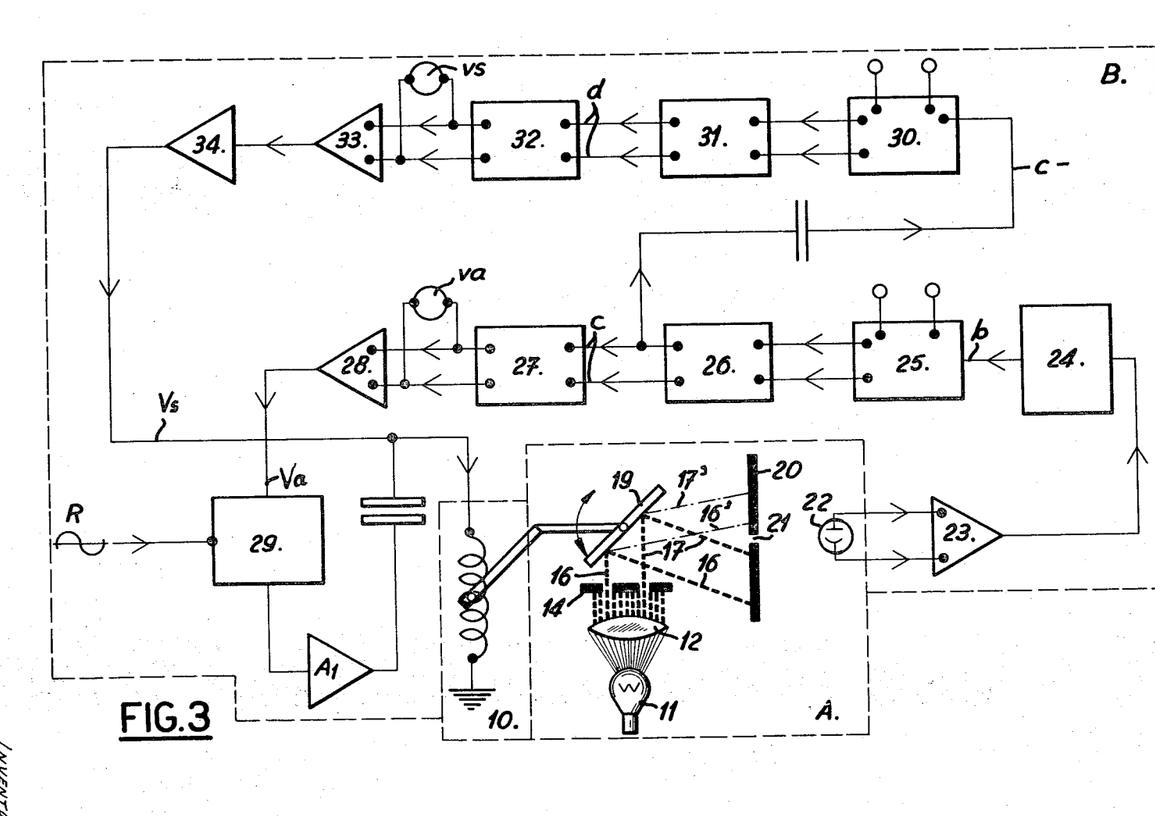
FIG. 3 is a block diagram of the electronic part of the regulating device.

The operation of the detection device A is as follows (FIG. 3).

During the oscillation of the deflector 9 the mirror 19 is driven in an identical oscillation since it is fast with this deflector. This mirror 19 oscillates periodically and causes a scanning movement of the pencils of rays 16 and 17 onto the mask 20 extending from the position shown in heavy dashed lines (16, 17) until the position shown in fine lines 16', 17'.

During this scanning the two pencils of rays 16, 17 traverses the slot 21 of the mask 20 so that for a complete cycle, corresponding to a fore and return stroke of the scanning, the photoelectric cell 22 emits four pulses.

The control device B comprises a preamplifier 23 amplifying the pulses delivered by the photoelectric cell 22. These amplified pulses are then shaped in 24 by means of a differentiating circuit followed by a Schmitt trigger and an amplifying stage. One obtains in this manner at the output of the shaping stage 24, for each pulse delivered by the photoelectric cell 22, a rectangular pulse of short duration $b$ (FIG. 4) the forefront of which corresponds to the summit of the pulse formed by the photoelectric cell 22.

Figure 4:
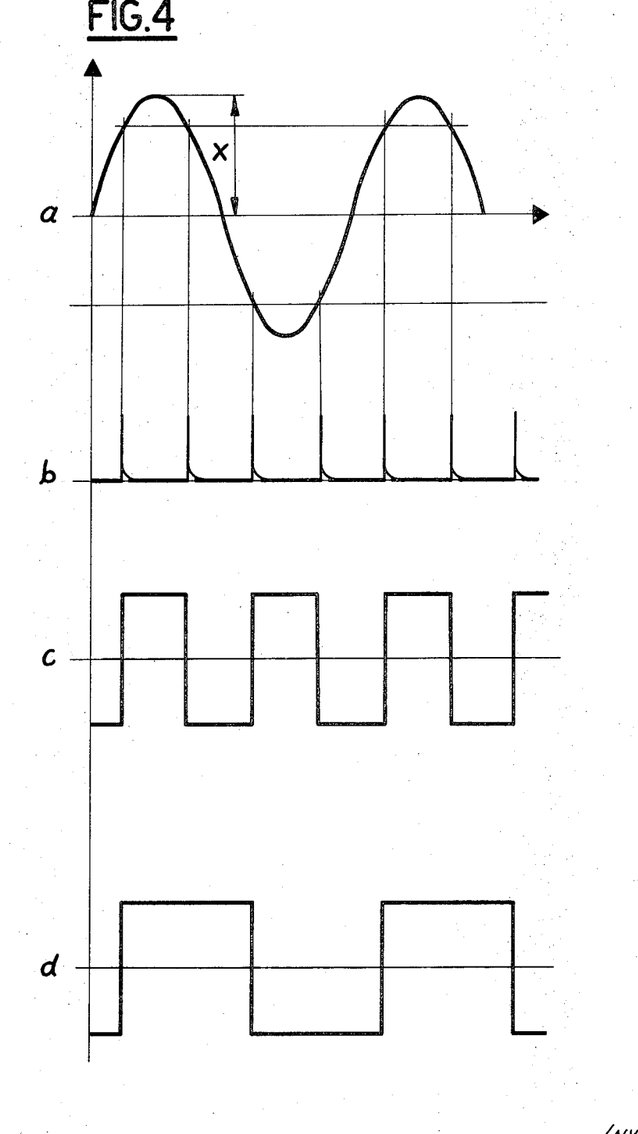
FIG. 4 shows, in normal working condition, *a* the oscillatory movement of the deflector, *b* the electrical signal furnished by the detection device after shaping, *c* the signal of the bistable multivibrator of the amplitude regulating loop and *d* the signal of the bistable multivibrator of the symmetry regulating loop.
Figure 7:
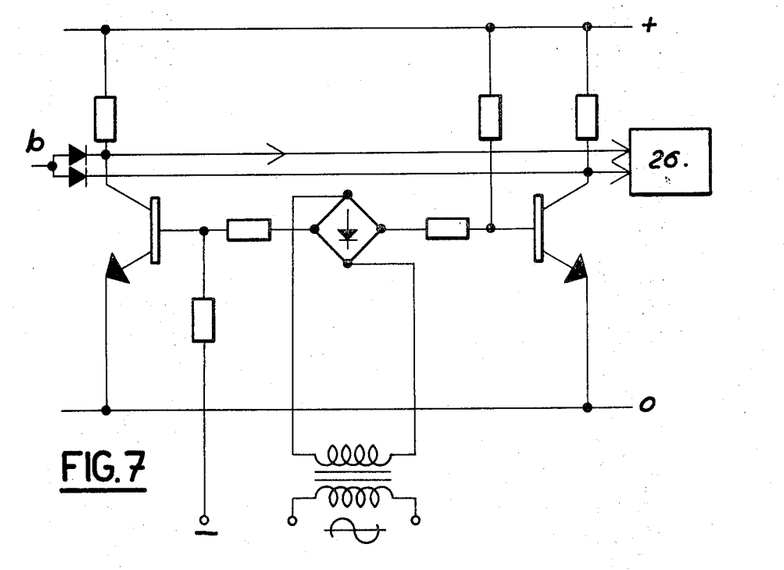
FIG. 7 is a diagram of a 100 Hz. distributor.

These pulses $b$ are delivered by means of a distributor 25 (FIG. 7) alternatively to the two inputs of a bistable multivibrator 26 of the amplitude regulating loop. Each pulse $b$ causes the change of state of the multivibrator 26. The signal $c$ of this bistable multivibrator of the amplitude regulating loop is delivered to an L-C filter 27 so as to deliver the continuous component of the signal of this bistable multivibrator 26. The continuous voltage $va$ of the signal of this bistable multivibrator 26 is nought in normal working conditions of the deflector and is amplified by a D-C amplifier 28 and is applied to a variable gain circuit 29 (FIG. 8) feeding a power amplifier $A_1$.

Figure 8:
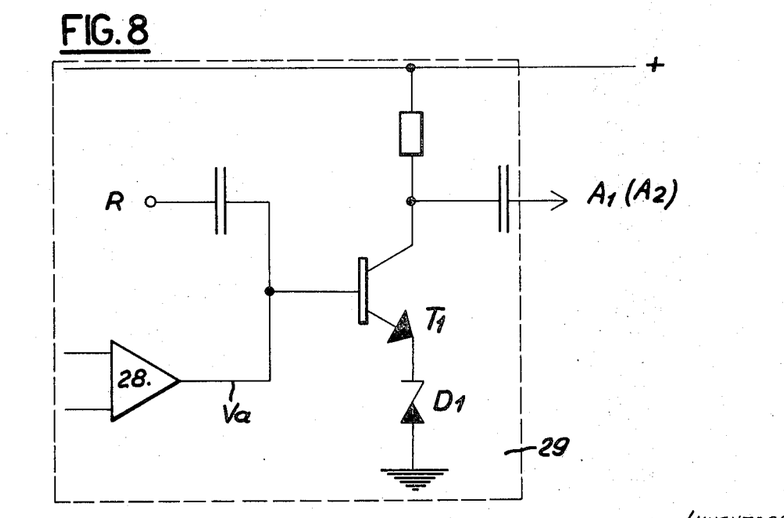
FIG. 8 is a diagram of a variable gain circuit.

The diode $D_1$ of this variable gain circuit is a Zener diode having a logarithmic characteristic. Its dynamic resistance varies as a function of the voltage applied to its terminals.

This diode is connected to the emitter of the transistor $T_1$ and is thus a feed-back element.

By modifying the biasing of the base of $T_1$, one modifies also the voltage applied to the terminals of the diode, thus changing the value of the feed-back.

Therefore the A-C gain of $T_1$ varies and the value of the alternating voltage is a function of the D-C voltage $Va$.

This variable gain circuit 29 is fed by an A-C source R and feeds the actuating device 10 of the deflector by means of a power amplifier $A_1$. This amplified D-C voltage $Va$ constitutes thus the amplitude error signal which by modifying the gain of the power amplification causes a modification of the amplitude of the oscillation of the deflector 9 and thus of the mirror 19.

The operation of this amplitude regulating loop is as follows:

As soon as the amplitude of the oscillation of the deflector varies, that is to say differs from its normal amplitude X, for example increases (FIG. 5), the pulses of the photoelectric cell 22 and thus the pulses $b$, do not follow themselves any more at constant time intervals. Therefore the signal $c$ delivered by the multivibrator is no longer symmetrical and shows a D-C component $va$ which is positive if the amplitude increases, and which is negative if the amplitude diminishes with respect to the amplitude of the oscillation of the deflector in its normal working condition X. This D-C voltage $va$, after amplification, furnishes the error signal $Va$ which varies the gain of the circuit 29 and thus the amplitude of the signal feeding the actuating device 10 of the deflector 9, in such a way as to correct its amplitude error.

The control device B comprises further a symmetry regulating loop of the oscillation of the deflector with respect to its centered position.

Figure 9:
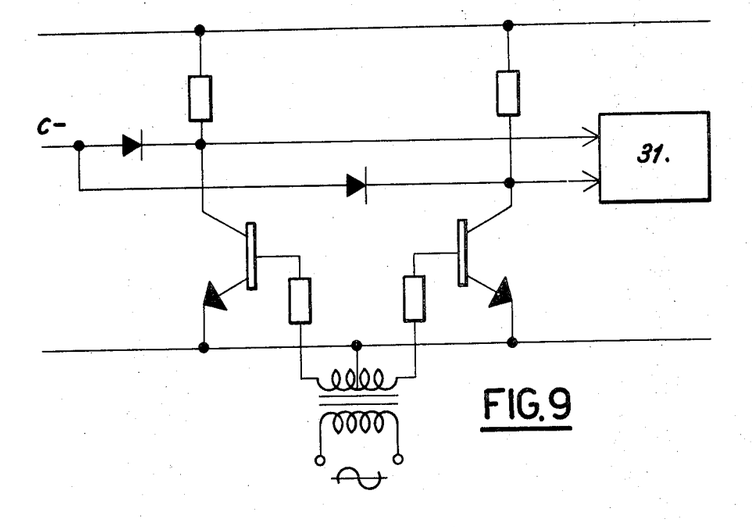
FIG. 9 is a diagram of a 50 Hz. distributor.

This symmetry regulating loop comprises a distributor 30 which delivers to a bistable multivibrator 31 the negative pulses only $c-$ of the output signal $c$ of the bistable multivibrator 26 that is for example the forefront only of the rectangular voltage $c$. The pulses $c-$ are delivered alternately, at a frequency equal to half that with which the distributor 25 (FIG. 7) is operated, by the distributor 30 (FIG. 9) to the bistable multivibrator 31. This bistable multivibrator 31 is identical to the bistable multivibrator 26 and delivers a rectangular voltage $d$ the D-C component $vs$ of which is nought if the deflector oscillates in a symmetrical way with respect to its centered reference position. This D-C component $vs$ is obtained thanks to a filter 32 to which are delivered the signals $d$ of this bistable multivibrator 31.

This D-C voltage $vs$ is succesively amplified by a preamplifier 33 then by a power amplifier 34 to form the symmetry error signal $Vs$ which controls the actuating device 10 of the deflector 9.

The operation of this symmetry regulating loop is as follows:

When the oscillation of the deflector $a$ is no longer symmetrical with respect to its reference centered position (FIG. 6) the succession of impulses delivered by the photoelectric cell 22 occurs no longer at regular time intervals. However, when there is a pure symmetry error, and if the sinusoidal movement of the deflector is assimilated to a movement having the shape of a trapezoidal wave, it should be noted that, even through the signal $c$ delivered by the bistable multivibrator 26 is no longer symmetrical, its D-C component remains nought. A pure symmetry error does not give rise to an ampliture error signal. This is true for a first order appoximation, corresponding to the assimilation of a part of the sinusoid to a straight line. However, this approximation does introduce in fact only a second order error which is negligible in practice as it has been shown by tests.

Figure 6:
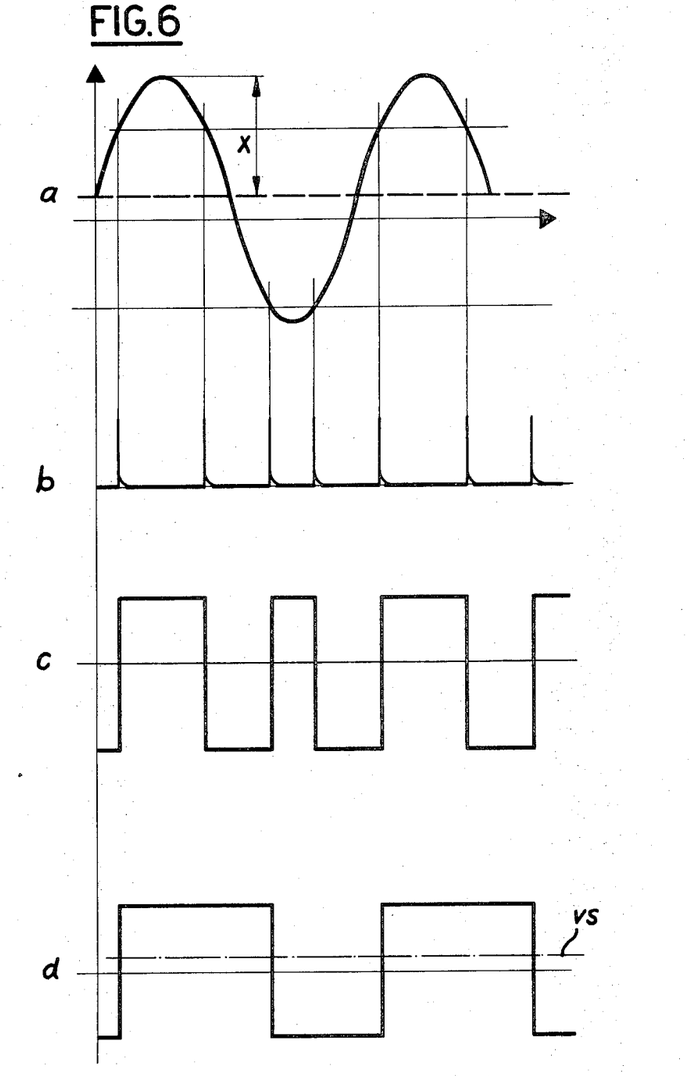

On the other hand, the signal delivered by the bistable multivibrator 31 comprises a D-C component $vs$ which delivers after amplification an error signal $Vs$. This D-C error signal $Vs$ is superimposed on the A-C feeding signal of the actuating device of the deflector and causes a shifting of the oscillation of the deflector so as to recenter it on its centered reference position.

Figure 5:
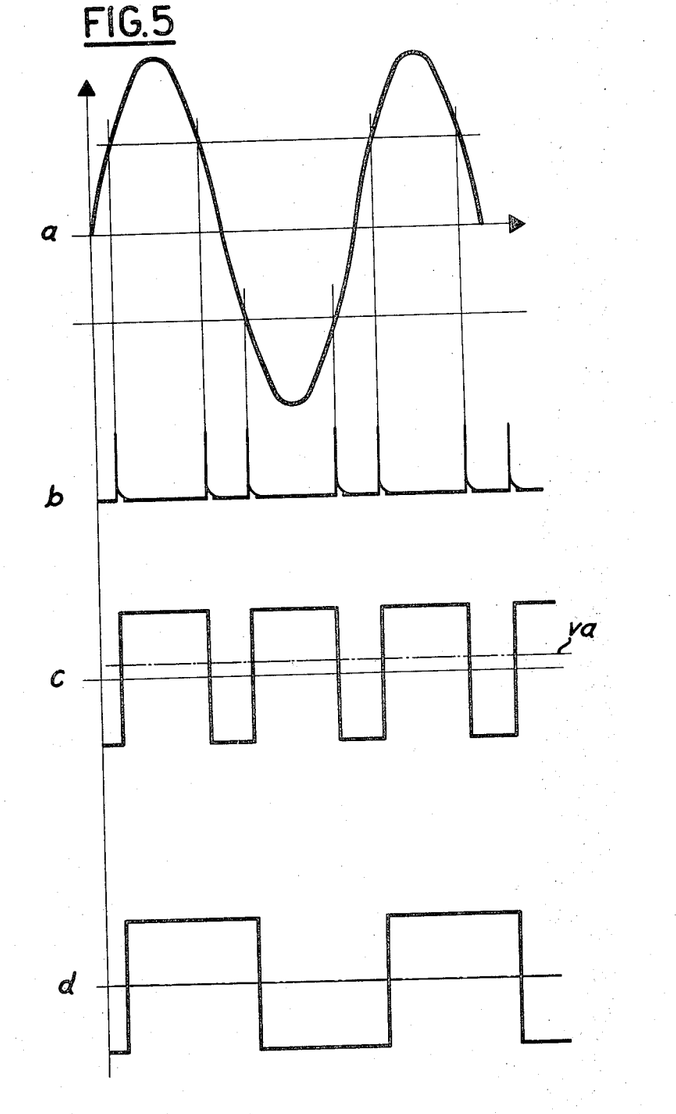
FIGS. 5 and 6 are diagrams similar to that of FIG. 4 but for an amplitude variation, respectively for an asymmetry of the oscillatory condition of the deflector with respect to its normal working condition.

It has to be further noted that in the case of a pure amplitude error of the oscillation of the deflector the pulses of the photoelectric cell 22 are such that the time intervals separating the odd pulses are equal so that the bistable multivibrator 31 delivers a signal $d$ presenting a D-C component which is nought (FIG. 5). Thus a pure amplitude error does not give rise to a symmetry error signal.

It is evident that when the oscillation of the deflector comprises an amplitude error as well as a symmetry error simultaneously the regulating device delivers simultaneously an amplitude error signal as well as a symmetry error signal.

Figure 2:
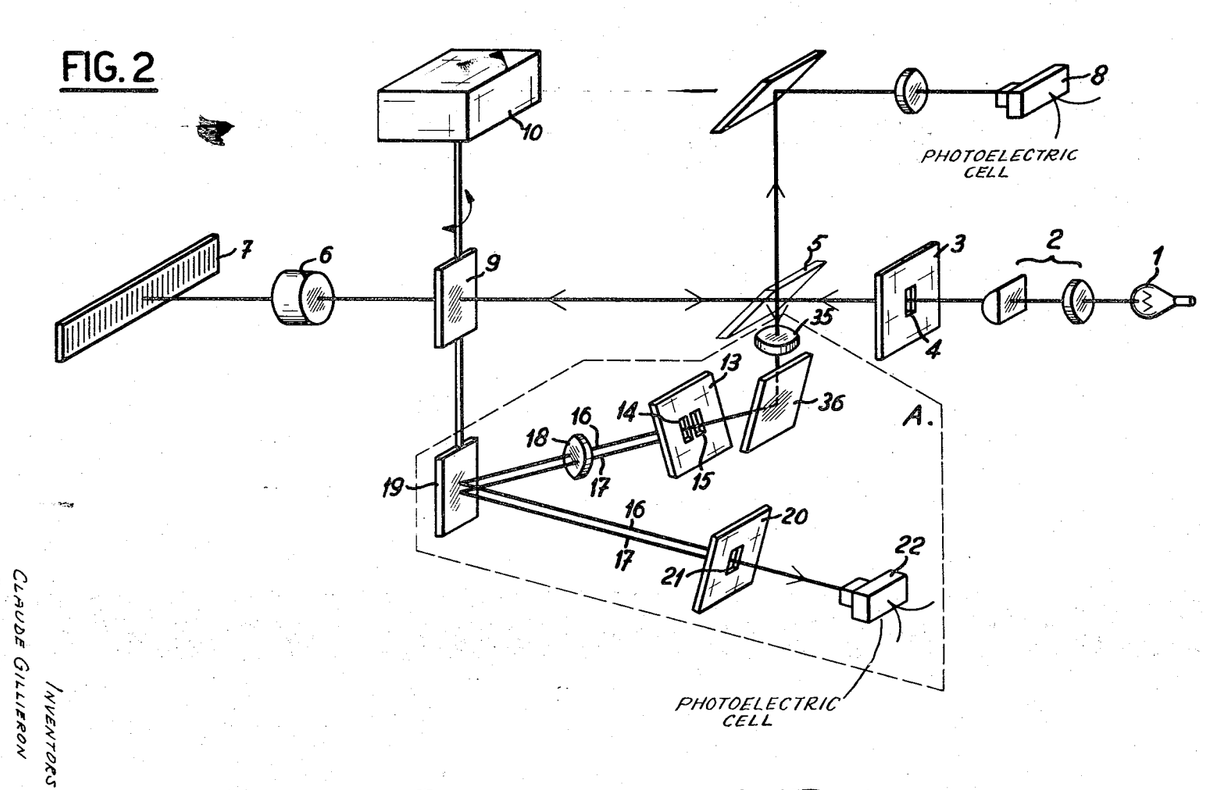
FIG. 2 is a diagram in perspective of a second embodiment of the photoelectric microscope.

The second embodiment of the photoelectric microscope, shown schematically in FIG. 2, differs from the first one only by the design of the detecting device A. As a matter of fact in this embodiment the light source 11 of this detecting device is replaced by the light reflected during the passage of the incident rays of the optical sighting device through the separator constituted by the semitransparent mirror 5. This is in effect a particularly good solution from the economic point of view as well as from the precision point of view. As a matter of fact the suppression of the light source 11 constitutes the elimination of a source of heat which is always awkward.

A lens 35 concentrates the light rays reflected by the separator 5 onto a mirror 36 which reflects them onto the mask 13 provided with two slots.

The operation of this second embodiment is identical to that of the first embodiment described hereabove.

For the control device shown measuring apparatus are provided to indicate the value of the D-C components $va$ and $vs$. This is however not necessary.

The regulating device of the vibrating member has been described with reference to one specific type of photoelectric microscope. It is however evident that other known types of photoelectric microscopes can be equipped with this regulating device, such as for example the photoelectric microscopes comprising vibrating wires or having transparent rulers. In the case of the vibrating wire photoelectric microscopes the angular oscillation of the mirror 19 would be for example electrically synchronized with the reciprocal displacements of the vibrating wire.

On the other hand the mirror 19 may be, in a variant, replaced by any other deflector such as a glass with parallel faces for example.

Figure 10:
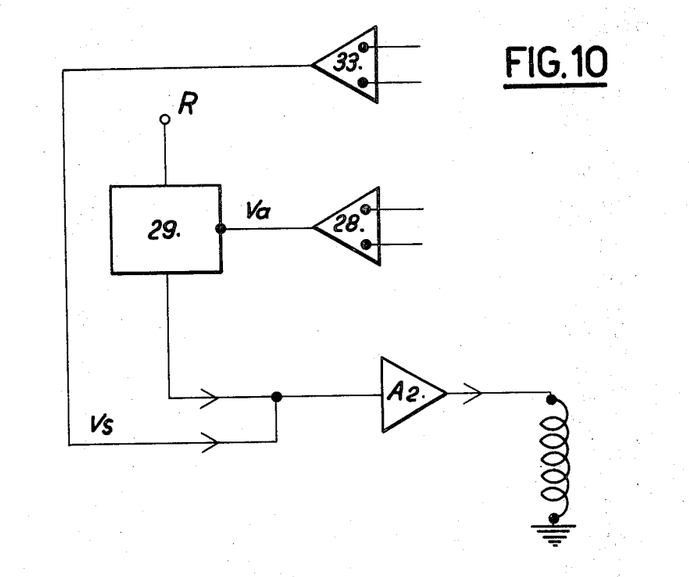
FIG. 10 is a partial diagram of a variant of execution.

Further the electronic part of the regulating device, for instance the control device, could be realized in a different way provided that it enables to deliver, out of the indications of the detecting device, two error signals, the one relative to the amplitude errors and the other relative to the symmetry errors of the oscillatory condition of the vibrating member with respect to its normal oscillation condition. In a variant (FIG. 10), the mixing of the D-C voltages $Vs$ and A-C voltages $Va$ can be done before a direct coupled power amplifier $A_2$ which feeds the actuating device of the deflector 10.

The detection device described is an optical one but it is evident that the pulse train $b$ could be obtained by purely mechanical or/and electrical means from the oscillation of the vibrating member of the photoelectric microscope and the result would be the same.

REFERENCES AND BIBLIOGRAPHY (a) Bistable multivibrators (26, 31): Transistor Circuit Design Texas; page 377 Fig. 28.3. McGraw-Hill, 1963

(b) Schmitt trigger (24) (24): Transistor Circuit Design Texas, page 382 Fig. 28.11. McGraw-Hill, 1963

(c) D-C amplifier (34) and combined amplifier. ($A_1A_2$): Electronic Engineering, February 1965; pages 112–114.

(d) Power amplifier (29): Transistor Circuit Design Texas; page 241 Fig. 18.3. McGraw-Hill, 1963.

We claim:

1. A photoelectric microscope comprising a vibrating member, an actuating device for driving said vibrating member in a periodic oscillation about a centered reference position, said actuating device comprising a regulating device which in turn comprises a detecting device for furnishing an electrical signal which depends upon the actual oscillatory condition of the vibrating member and a control device, said control device being fed by said electrical signal and emitting on the one hand a first error signal relating to the amplitude of the oscillation of the vibrating member and on the other hand a second error signal relating to the symmetry of the oscillation of the vibrating member with respect to said reference position, the two said error signals modifying the working conditions of the actuating device of the vibrating member so as to correct any amplitude error and symmetry error of the oscillation of the vibrating member with respect to its normal oscillatory condition.

2. A photoelectric microscope as claimed in claim 1, said detecting device being in the form of an optical device comprising a source of rays, an optical deflector driven in oscillation identically as said vibrating member, means forming two pencils of rays from said source of rays impinging on said deflector, and a photoelectric cell receiving the pencils of rays reflected by said deflector.

3. Photoelectric microscope according to claim 2, in which the reflected pencils of rays reach the photoelectric cell through the slot of a mask, this slot being located symmetrically with respect to these two reflected pencils when the deflector is located in its centered reference position.

4. Photoelectric microscope according to claim 3, in which the distance separating the two parallel pencils of rays depends of the amplitude of the oscillation of the vibrating member of the photoelectric microscope.

5. Photoelectric microscope according to claim 4, in which the distance separating the two pencils of rays is equal to $\sqrt{2}/2$ multiplied by the amplitude of the oscillation of the vibrating member.

6. Photoelectric microscope according to claim 2, in which the deflector is mechanically fast with the vibrating member of the photoelectric microscope.

7. Photoelectric microscope according to claim 1, in which the deflector is constituted by a mirror.

8. Photoelectric microscope according to claim 1, in which the deflector is constituted by a glass having parallel plane faces.

9. Photoelectric microscope according to claim 2, in which the source of rays of the detecting device is an auxiliary source of rays.

10. Photoelectric microscope according to claim 2, in which the source of light necessary for the detecting device is delivered by the optical sighting device of the photoelectric microscope.

11. Photoelectric microscope according to claim 1, in which the detecting device is a mechanical and/or an optical one.

12. Photoelectric microscope according to claim 1 in which the amplitude error signal is applied to the gain control of a variable gain amplifier, feeding in A-C current the actuating device of the vibrating member of the photoelectric microscope.

13. Photoelectric microscope according to claim 12, in which the symmetry error signal is superimposed to the A-C current feeding of the actuating device of the vibrating member of the photoelectric microscope.

14. Photoelectric microscope according to claim 13, in which both amplitude and symmetry error signals are in first approximation independent the one from the other.

15. Photoelectric microscope according to claim 1 in which the amplitude error signal feeds a variable gain circuit, the output of which, mixed with the symmetry error signal is applied to a direct coupling power amplifier, this power amplifier feeding the actuating device of the deflector.

References Cited

UNITED STATES PATENTS

| 3,010,362 | 11/1961 | Smith | 250—201 |
| 3,042,804 | 7/1962 | Koulikovitch | 250—206 |
| 3,254,227 | 5/1966 | Hock | 250—201 X |
| 3,305,691 | 2/1967 | Hock | 250—201 X |
| 3,446,968 | 5/1969 | Török | 250—206 X |

RONALD L. WIBERT, Primary Examiner

R. J. WEBSTER, Assistant Examiner

U.S. Cl. X.R.

250—201, 234, 237; 356—201